United States Patent [19]

Kiessling

[11] Patent Number: 4,554,228

[45] Date of Patent: Nov. 19, 1985

[54] NEGATIVE ELECTRODE FOR LEAD ACCUMULATORS

[75] Inventor: Reiner Kiessling, Anröchte, Fed. Rep. of Germany

[73] Assignee: Hagen Batterie AG, Soest, Fed. Rep. of Germany

[21] Appl. No.: 597,668

[22] Filed: Apr. 6, 1984

[30] Foreign Application Priority Data

Apr. 7, 1983 [DE] Fed. Rep. of Germany ....... 3312550

[51] Int. Cl.⁴ .............................................. H01M 4/74
[52] U.S. Cl. .................................... 429/242; 429/234; 429/245
[58] Field of Search .......................... 429/242, 245, 234

[56] References Cited

U.S. PATENT DOCUMENTS

| | | | |
|---|---|---|---|
| 1,982,485 | 11/1934 | Salmon et al. ................. | 429/242 X |
| 3,180,761 | 4/1965 | Horn et al. .................... | 429/242 |
| 3,607,411 | 9/1971 | Brownrigg ..................... | 429/242 |
| 3,738,871 | 6/1973 | Scholle ......................... | 429/245 X |
| 3,891,459 | 6/1975 | McCartney et al. ........... | 429/242 X |
| 4,237,205 | 12/1980 | Matter .......................... | 429/234 |
| 4,386,987 | 6/1983 | Covitch et al. ................ | 429/242 X |

*Primary Examiner*—Charles F. LeFevour

[57] ABSTRACT

A negative electrode for lead accumulators has the form of a rectangular, expanded metal, grid plate 11 of copper. The grid plate serves as carrier for the active mass and for the supply and extraction of current. The direction of stretching of the expanded metal extends parallel to the edge of the rectangular grid plate at which the connection lug is arranged. A lead strip 13, which is in one piece with the connection lug, is conductively secured to the top edge of the grid plate. The lead strip 13 is cast onto the grid plate 11 (FIG. 1).

21 Claims, 1 Drawing Figure

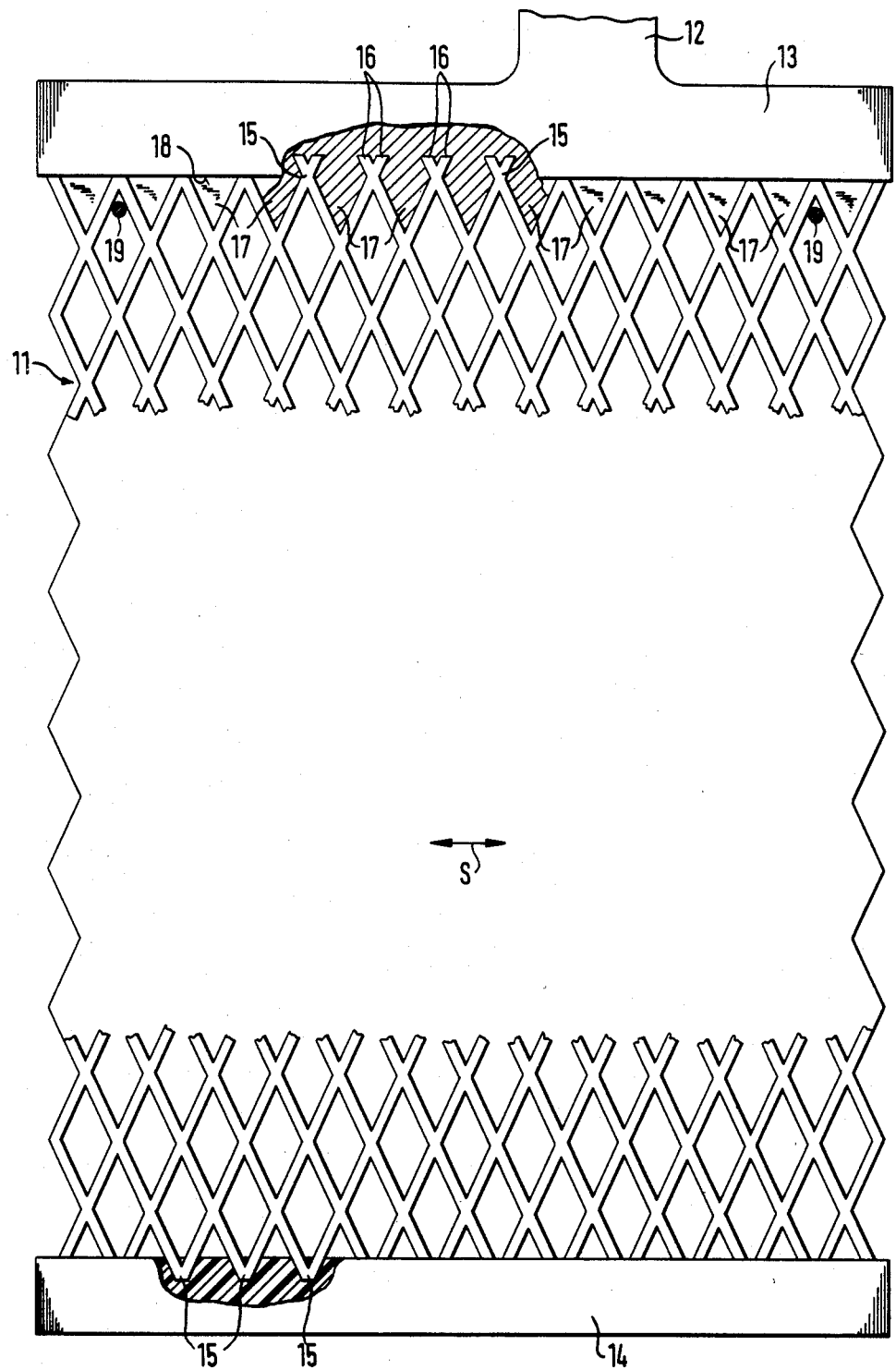

NEGATIVE ELECTRODE FOR LEAD ACCUMULATORS

The invention relates to a negative electrode for lead accumulators in the form of a rectangular, expanded metal, grid plate of copper which serves as a carrier for the active mass and for current supply and extraction, wherein the direction of stretching of the expanded metal extends parallel to the side of the rectangular grid plate at which the connection lug is provided, and wherein a lead strip, which is in one piece with the ocnnection lug, is conductively secured to the relevant edge of the grid plate over the whole length thereof.

With a known negative electrode of this kind (DE-PS No. 2241368) the problem exists of connecting the lead strip which carries the connection lug to the grid plate in problem-free manner. The transition region from the massive lead strip to the expanded metal is, in particular, a problematic area which is not only of importance for achieving a problemfree current transfer but is also an area which may not be subjected to the danger of breakage. It is furthermore disadvantageous that the termination strip provided at the lower end of the grid plate consists of lead which considerably increases the weight of an accumulator equipped with the electrode.

The problem underlying the present invention is thus to provide a negative electrode of the initially named kind in which a problemfree connection, i.e. a secure connection of high conductivity, is present between the lead strip carrying the connection lug and the grid plate.

In order to solve this problem the invention provides for the lead strip be cast onto the grid plate. In this manner an intimate bond is achieved between the expanded metal grid plate of copper, which is of good conductivity, and the lead strip. Through the casting on of the lead strip an intimate bond also results between the lead which surrounds the expanded metal grid plate of copper and the lead of the lead strip, so that a practically non-releasable mechanical bond is established.

It is particularly advantageous if the lower edge of the lead strip extends substantially through the outermost crossing points of the grid plate.

A particularly good anchoring of the expanded metal grid plate of copper in the lead strip is obtained when the grid plate is cut off at the securing side just beyond the crossing points in such a way that short anchoring webs, which project beyond the crossing points, are present for the casting of the lead of the strip around the relevant edge of the grid plate.

This provides the required conductivity and forms the basis for the current transfer from the expanded metal into the strip and vice versa.

A particularly good mechanical bond between the lead strip and the grid plate, which is not sensitive to bending forces in the plane of the grid plate, can be achieved when the fields at the securing side which have their greatest width at the lower edge of the lead strip are also cast full of lead.

In this manner a second lead strip provided with V-shaped notches is effectively provided directly alongside and parallel to the actual lead strip and this ensures problemfree force transfer from the lead strip to the grid plate for all conceivable loads.

In order to significantly reduce the weight of the electrode a further embodiment of the invention is characterised in that the termination strip provided at the edge of the grid plate remote from the lead strip carrying the connection lug consists of acid resistant synthetic material.

The synthetic material can be injection-molded around the lower end region of the grid plate. It is however preferred when the end region of the grid plate is pressed in heated condition into the thermoplastic synthetic material. In order to make this pressing-in effortless the grid plates should be cut off at their lower ends at the level of the crossing points, so that V-shaped tips are created which in the heated condition can be pressed into the synthetic material without problem.

In order to facilitate the casting of lead around the grid plate and the pressing of the grid plate into the synthetic material a further embodiment is characterised in that the end regions of the grid plate, which are either cast around with lead or surrounded by synthetic material, are pressed flat into the plane of the grid plate prior to the casting on of the lead and application of the synthetic material respectively.

As the lead coating of an already leaded expanded metal plate of copper could be damaged during heating for the purpose of pressing the grid plate into the strip of synthetic material it is preferable for the termination strip to be attached to the expanded metal grid plate prior to the application of the lead-tin layer and/or of the lead layer. Furthermore, it is also preferably arranged that the application of the led-tin alloy and of the final lead layer take place one after the other by the galvanic of route after the termination strip has been attached.

The synthetic strip is thus directly connected with the expanded metal copper grid plate. The subsequent galvanic application of the lead-tin alloy and of the lead layer ensures that the copper is completely sealed against the acid bath even in the region at which it enters into the synthetic material.

Preferred ranges of values for the metals that are used, such as the current density during galvanising and the dimensions of the expanded metal are set forth in the patent claims 12 to 18.

The invention will now be described in the following by way of example and with reference to the drawing, the single FIGURE of which shows a partly sectioned view of a negative electrode for lead accumulators.

As seen in the drawing the grid plate 11 of copper in the form of a sheet of expanded metal is cut off at the top and the bottom parallel to the direction of stretching S. The expanded metal is cut off at the lower end in the region of the crossing points 15. At this region the grid plate 11 is pressed approximately 5 mm deep into the narrow side of a rectangular termination strip 14 of synthetic material, and indeed in such a way that the synthetic material sealing surrounds the narrow, lower end region of the grid plate 11 on all sides.

At the upper end region the grid plate 11 is cut off above the crossing points in such a way that short webs 16 remain above the crosing points 15 and these crossing points are embedded in the lead strip 13 which carries the connection lug 12. The lower edge 18 of the lead strip 13 extends substantially through the crossing points 15.

The manufacture of the negative electrode of the invention proceeds as follows:

First of all the expanded metal (copper) is cut in the manner shown in the drawing into rectangular pieces with the cut being effected through the crossing points 15 at the bottom end and somewhat above the crossing points 15 at the top end. The expanded metal is then heated at its lower end region and is plunged into the narrow side of the termination strip of thermoplastic synthetic material. Pressure is then exerted on the broad sides of the strip by means of correspondingly shaped plates in such a way that the lower end of the grid plate 11 which has been thrust into this synthetic material is surrounded on all sides by the synthetic material. The expanded metal is then suspended from a current supply (not shown) by means of schematically illustrated hooks 19. The expanded metal is first hung in a cleaning and rinsing bath in order to provide a suitable surface for the subsequent galvanising.

After cleaning the grid plate is suspended in a lead-tin bath and a negative voltage is applied whereupon a lead-tin alloy in the ratio of approximately 90:10 is deposited on the surface of the expaned metal. The current remains switched on until a lead or layer of at least 7 $\mu$m and preferably 10 $\mu$m has been deposited on the expanded metal.

The grid plate 11 is subsequently lifted from the bath by means of the hooks 19 and is suspended, without intermediate rinsing, in a further galvanic bath containing lead ions. A negative voltage is once again applied to the grid plate 11 whereupon lead is deposited on the surface. The current supply is continued until the thickness of the lead layer amounts to at least 20 $\mu$m and preferably approximately 40 $\mu$m. The current density amounts to from 6:10 A/dm$^2$ in order to obtain a coarse crystalline surface which is as rough as possible and which forms a good electrical contact with the negative mass which is later applied.

The grid plate 11 carrying the termination strip of synethetic material is now prepared for the casing on of the lead strip 13 at the upper end. This takes place in a correspondingly shaped mold which is however leaky at the points where the webs 16 pass through the mold in such a way that on pouring the lead into the mold not only is the lead strip 13 with the connection lug 12 cast but the fields 17 also are filled with liquid lead. In this way a good current transfer is obtained from the lead strip 13 to the grid plate 11 during handling and also in later operation.

By casting lead around the web 16 the lead layer present on the expanded metal bonds intimately with the lead material of the strip 13 so that an ideal bond is obtained both from the point of view of strength and from the point of view of current transfer.

Prior to insertion into the strip 14 of synthetic material, and prior to the casting on of lead in the region of the lead strip 13, the ends of the grid plate 11 are pressed flat in their own plane by a suitable tool and indeed in the plane of the grid plate.

The negative mass can now be introduced into the grid plate 11 and it should be noted that the stiffness of the mass is somewhat lower than usual so that the mass, one being applied from one plane of the grid plate, reliably reaches the rear side of the grid plate and there ensures clean pasting. When using a web width of 2 mm negative electrode plates can be manufactured with a thickness of approximately 4.5 mm by overpasting.

The mesh length preferably amounts to from 15 to 30 mm. In this way it is ensured that the current in the negative mass has to travel at most a distance of 5 mm, the mean value of the path travelled amounts to approximately 2 mm.

As a result of the mesh size used in accordance with the invention one obtains a current path which is not too long while avoiding too many stamping steps. The amount of copper used is likewise limited by the mesh size of the invention which is favourable both from the point of view of low weight of the electrode plate and also from the point of view of the manufacturing costs. At the same time a high conductivity is achieved.

The thickness of the sheet of copper used for the expanded metal should preferably be approximately 0.6 mm which on the one hand reduces costs and on the other hand enables a lower number of meshes for the same conductivity. A lower number of meshes also has the advantage that the surface of the grid plate does not become too large so that the leading costs are also held within limits. A larger quantity of lead would also increase the weight of the electrode plate.

I claim:

1. In a negative electrode for lead accumulators in the form of a rectangular expanded metal grid plate of copper having upper and lower ends forming upper and lower crossing points of said grid which serves as a carrier for an active mass and for current supply and extraction, the direction of stretching of the expanded metal extending parallel to an end of the rectangular grid plate at which a connection lug is provided, and wherein a lead strip, unitary with a connection lug, is conductively secured to one end of said grid plate over the whole length thereof, improvement wherein the lead strip is cast onto the grid plate and said copper grid is covered by a lead or lead-tin alloy layer.

2. An electrode in accordance with claim 1 wherein the lower portion of the lead strip extends substantially through the outermost upper crossing points of said grid plate.

3. An electrode in accordance with claim 1 wherein the grid plate is cut off at its upper end just beyond the upper crossing points in such a way that short anchoring webs project beyond said upper crossing points for securing the casting of the lead of said strip around the upper portion of said grid plate.

4. An electrode in accordance with claim 1 wherein the openings formed by said grid immediately adjacent said lead strip are also cast full of lead.

5. An electrode in accordance with claim 1 wherein a termination strip is provided at the lower end of the grid plate remote from the lead strip carrying the connection lug, said termination strip comprising an acid resistant synthetic material.

6. An electrode in accordance with claim 5 wherein said synthetic material is injection-molded around the lower end region of the grid plate.

7. An electrode in accordance with claim 5 wherein the lower end region of the grid plate is pressed in heated condition into the thermoplastic synthetic material.

8. An electrode in accordance with claim 5 wherein said grid plate is cut off at its lower end at the level of said crossing points.

9. An electrode in accordance with claim 1 wherein the end regions of the grid plate which are either cast with lead or surrounded by synthetic material, are pressed flat in a plane to form the grid plate prior to the casting of the lead and application of the synthetic material respectively.

10. An electrode in accordance with claim 5 wherein the termination strip is applied to the expanded metal grid plate of copper prior to the application of the lead-tin layer and/or of the lead layer.

11. An electrode in accordance with claim 10 wherein the application of the lead-tin alloy and the final lead layer take place one after the other by galvanic deposition following the attachment of the termination strip.

12. An electrode in accordance with claim 11 wherein the lead-tin alloy contains at least 8% tin.

13. An electrode in accordance with claim 11 wherein the lead layer is from about 20 μm to 40 μm thick.

14. An electrode in accordance with claim 11 wherein the current density during galvanizing, in particular during the application of the lead layer, amounts to from about 6 to 10 A/dm².

15. An electrode in accordance with claim 1 wherein the stretching ratio of the expanded metal amounts to from about 0.5 to 0.6.

16. An electrode in accordance with claim 1 wherein the web width of the expanded metal amounts to from about 1.7 to 2.3 mm when the resulting plate is surrounded on both sides by a positive plate.

17. An electrode in accordance with claim 1 wherein the web thickness of the expanded metal amounts to from about 0.4 to 0.8 mm.

18. An electrode in accordance with claim 1 wherein the mesh length of the expanded metal amounts to from about 15 to 30 mm.

19. An electrode in accordance with claim 1, wherein the web width of the expanded metal is aproximately 2 mm.

20. An electrode in accordance with claim 1, wherein the web thickness of the expanded metal is approximately 0.6 mm.

21. An electrode according to claim 1, wherein the mesh length of the expanded metal is approximately 20 mm.

* * * * *